United States Patent
Maresca

(10) Patent No.: US 12,272,260 B2
(45) Date of Patent: Apr. 8, 2025

(54) DEVICE TO FACILITATE MUSICAL INSTRUMENT LEARNING

(71) Applicant: VISUAL NOTE S.R.L., Milan (IT)

(72) Inventor: Vincenzo Maresca, Terracina (IT)

(73) Assignee: VISUAL NOTE S.R.L, Milan (IT)

(*) Notice: Subject to any disclaimer, the term of this patent is extended or adjusted under 35 U.S.C. 154(b) by 117 days.

(21) Appl. No.: 18/270,722

(22) PCT Filed: Jun. 21, 2021

(86) PCT No.: PCT/IB2021/055431
§ 371 (c)(1),
(2) Date: Jun. 30, 2023

(87) PCT Pub. No.: WO2022/149007
PCT Pub. Date: Jul. 14, 2022

(65) Prior Publication Data
US 2024/0078928 A1    Mar. 7, 2024

(30) Foreign Application Priority Data
Jan. 7, 2021  (IT) .......................... 102021000000161

(51) Int. Cl.
*G09B 15/00* (2006.01)
*G10G 1/02* (2006.01)

(52) U.S. Cl.
CPC ............. *G09B 15/003* (2013.01); *G10G 1/02* (2013.01)

(58) Field of Classification Search
CPC ................................. G09B 15/003; G10G 1/02
See application file for complete search history.

(56) References Cited

U.S. PATENT DOCUMENTS

| | | | | |
|---|---|---|---|---|
| 4,791,848 A * | 12/1988 | Blum, Jr. | ............... | G09B 15/06 84/485 R |
| 4,901,618 A * | 2/1990 | Blum, Jr. | ................. | G10G 1/02 984/252 |
| 5,040,447 A * | 8/1991 | Murata | .................... | G10H 3/18 84/723 |
| 7,427,704 B2 * | 9/2008 | Huwaldt | .................. | G10G 1/02 84/314 R |
| 7,427,707 B2 * | 9/2008 | Shaffer | .................... | G10D 3/06 84/464 A |
| 7,825,313 B2 * | 11/2010 | Shaffer | ................... | G10D 3/06 84/646 |

(Continued)

FOREIGN PATENT DOCUMENTS

| | | | | |
|---|---|---|---|---|
| WO | WO-9414157 A1 * | 6/1994 | .......... | G09B 15/003 |
| WO | WO-2014020629 A1 * | 2/2014 | .......... | G09B 15/003 |

*Primary Examiner* — Robert W Horn
(74) *Attorney, Agent, or Firm* — R. Ruschena Patent Agent, LLC

(57) ABSTRACT

The present invention relates to a device to make a musical instrument learning easier, in particular a string instrument such for example a guitar or electric bass, and its respective method of usage. The device is configured to provide at the same time indications relating both to rhythmics and to the notes to be played, as well as to provide indications relating to the execution of arpeggio, and needed to play the various notes in a certain anticipation with respect to the moment in which each note has to be played, and by means of a luminous and chromatic sequence such that the user can optimize the reception of the information and, so, can learn faster.

8 Claims, 2 Drawing Sheets

(56) References Cited

U.S. PATENT DOCUMENTS

| | | | | |
|---|---|---|---|---|
| 8,093,482 B1* | 1/2012 | Kramer | ................ | G10H 1/0551 |
| | | | | 84/645 |
| 8,263,844 B2* | 9/2012 | Shaffer | .................... | G10D 3/22 |
| | | | | 84/293 |
| 10,403,167 B2* | 9/2019 | Borko | .................. | G09B 15/023 |
| 2009/0071314 A1* | 3/2009 | Huwaldt | .................. | G10D 3/06 |
| | | | | 84/485 R |
| 2009/0126553 A1* | 5/2009 | Murray | .................... | G10D 3/06 |
| | | | | 84/485 R |
| 2018/0218633 A1* | 8/2018 | Jacobsen | .................... | F21S 4/28 |
| 2024/0064884 A1* | 2/2024 | Maresca | ................ | H05B 45/20 |
| 2024/0078928 A1* | 3/2024 | Maresca | ............. | G09B 15/003 |
| 2024/0304104 A1* | 9/2024 | Adiletta | .................. | G09B 5/02 |

\* cited by examiner

DEVICE TO FACILITATE MUSICAL INSTRUMENT LEARNING

BACKGROUND OF THE INVENTION

1. Field of the Invention

The present invention relates to a device to make a musical instrument learning easier, in particular a string instrument such for example a guitar or electric bass, and its respective method of usage.

2. Brief Description of the Prior Art

At the state of the art there are known some devices to make a musical instrument learning easier, and in particular, there are known devices comprising a plurality of led lights, which can be applied at the keys of a string instrument keyboard, comprising a controller able to control the switching on and/or the color of each single LED synchronously with the music to be played. An example is described in document WO2014020629. Other examples are described in U.S. Pat. No. 4,791,848, AU2018101197, U.S. Pat. No. 6,191,348.

Technical Problem

Even if there exist known devices comprising a microcontroller configured to control a plurality of led lights positioned at the single keys of a string instrument keyboard, the actual result obtainable with these devices is not optimal, since no one is configured to carry out methods speeding up a user learning of an instrument.

In particular, the devices known at the state of the art are not configured to provide at the same time indications relating both to rhythmics and to the notes to be played and to provide indications relating to the execution of arpeggio.

Yet, they are not configured to provide the indications needed in advance with respect to the moment in which each note has to be played, and with a luminous and chromatic sequence such that the user can optimize the reception of the information and, so, can learn faster.

SUMMARY OF THE INVENTION

Aim of the present invention is to provide a device to make a string musical instrument learning easier, which overcomes the limits linked to the embodiments known at the state of the art, and in particular, is configured to carry out methods allowing to make the user instrument learning faster.

More in particular, aim of the present invention is to provide a device configured to provide at the same time indications relating both to rhythmics and to the notes to be played, as well as to provide indications relating to the execution of arpeggio.

According to another aim, the present invention provides a device to make a string musical instrument learning easier, configured to provide the indications needed to play the various notes in a certain anticipation with respect to the moment in which each note has to be played, and by means of a luminous and chromatic sequence such that the user can optimize the reception of the information and, so, can learn faster.

DETAILED DESCRIPTION OF THE INVENTION

Figure 1:
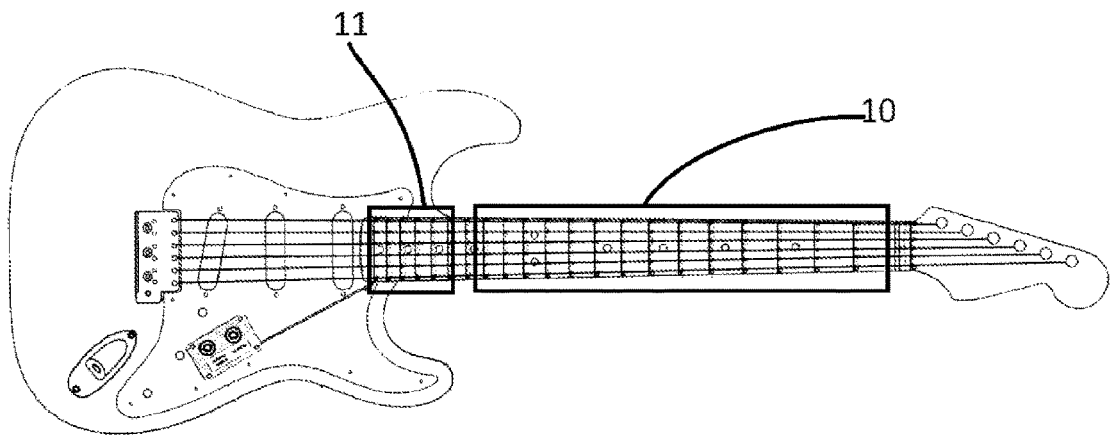
FIG. 1 shows the location of the two sub-assemblies in the case of a guitar.
Figure 2:
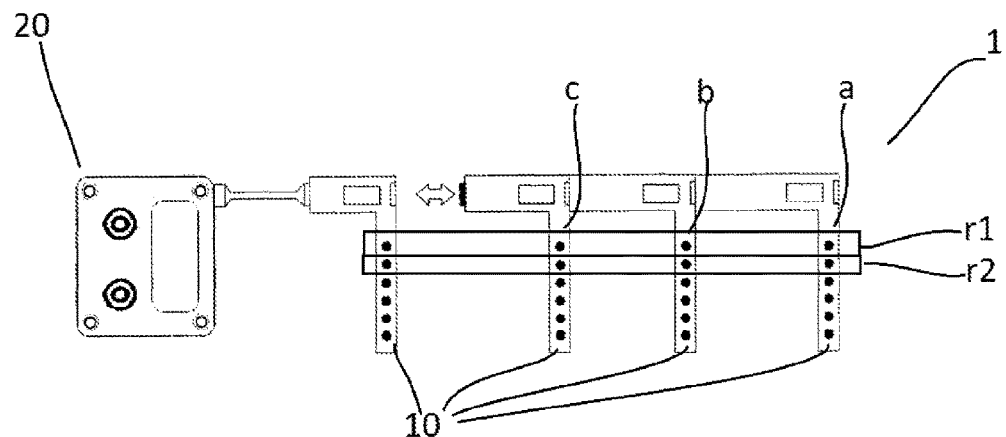
FIGS. 2 and 3 show two schematic views of an embodiment of the device.
Figure 3:
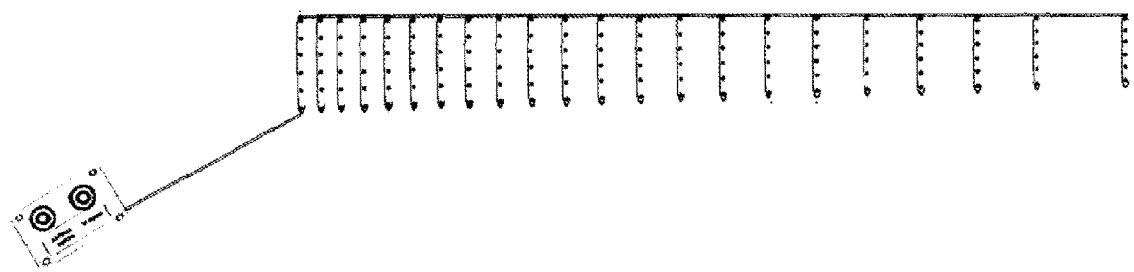

The device (1) according to the present invention comprises a plurality of RGB led lights, arranged in a plurality of columns (a, b, c) and a plurality of lines (r1, r2), and is configured so that each column corresponds to a key of the keyboard of a string instrument, such for example a guitar or a bass, and each line corresponds to a string. So, preferably, in case of a guitar, there are six lines.

Each LED lights column is positioned on a respective adhesive support (10) configured to be glued to the handle of the string instrument, under the strings.

So, the device comprises a plurality of adhesive supports (10).

Each LED light is coupled univocally to each key of the instrument keyboard, and can be identified by the definition of the respective line and column.

It is to be specified that with RGB LED light it is intended a LED light configured to be able to change the color of its own light emission as a function of the control of a respective controller.

The device (1) comprises further a controller (20), configured to control the switching on, the switching off and the color of each one of said led lights.

The device according to the invention is characterized in that it comprises further computing means on which computer programs are loaded, which are configured to carry out the LED lights control method, described in the following.

The method provides the steps of:
  100) subdividing said LED lights columns (a, b, c) in a first sub-assembly (10) of LED light columns relating to the keys of said string instrument keyboard, which can be pressed by the musician's hand, and in a second sub-assembly (11) of LED light columns relating to keys not used by the musician.

As a way of example, FIG. 1 shows the two sub-assemblies positioning in case of a guitar.
  200) communicating to the musician the indication relating to the keys to be pressed by switching on the LED lights of said first sub-assembly (10), and at the same time, communicating to the musician the indication of the strings to be played and their rhythmical sequence by switching on the LED lights of said second sub-assembly (11).

More in particular, the device is configured to visualize, by switching on one or more lights of said first sub-assembly of LED lights (10), the notes to be played on the keyboard to compose a chord in advance with respect to the moment in which the same have to be played, and with a variable color as a function of the time remaining before their execution.

Preferably, said second sub-assembly (11) of LED lights columns relating to the keys not used by the musician comprises the columns closer to the hand executing the rhymical portion (right hand in case of right-handed gripping).

In order to switch on the lights correctly, the device is configured:
  201) to associate to each finger of the hand positioned on the keyboard (left hand for right-handed gripping) a respective color;

210) to define a sequence of notes and/or chords needed to execute a song, by assigning to each one of them a respective duration (Dt0, Dt1, Dt2, Dtn . . . ) and a respective starting time (t0, t1, t2, tn . . . );

220) to switch on the assembly of lights of the keyboard corresponding to the first chord or note to be played, each light being switched on with the color associated to the finger which has to press the corresponding key;

230) after a starting instruction by the user, to switch on the lights relating to said sequence of notes and/or chords needed to carry out a song, by switching on the lights relating to each note and/or chord at the respective starting time (t0, t1, t2, tn . . . ) and by switching on each LED light with the color associated to the finger which has to press the corresponding key.

The method is characterized in that, during the song execution, the lights relating to said sequence of notes and/or chords needed to carry out a song, are also switched on with a first predetermined color, with a first anticipation with respect to its own starting time, and in that said first anticipation is a function of the duration of the immediately previous note and/or chord.

Moreover, preferably, during the song execution, the lights relating to said sequence of notes and/or chords needed to execute a song, are switched on with a second predetermined color, with a second anticipation with respect to its own starting time, and said second anticipation is lower than the first anticipation and is a function of the duration of the immediately previous note and/or chord.

Moreover, preferably, during the song execution, the lights relating to said sequence of notes and/or chords needed to execute a song, are switched on with a third predetermined color, with a third anticipation with respect to its own starting time, and said third anticipation is lower than said second anticipation and is a function of the duration of the immediately previous note and/or chord.

Preferably, the first predetermined color is red, the second predetermined color is orange and the third predetermined color is green.

Figure 4:
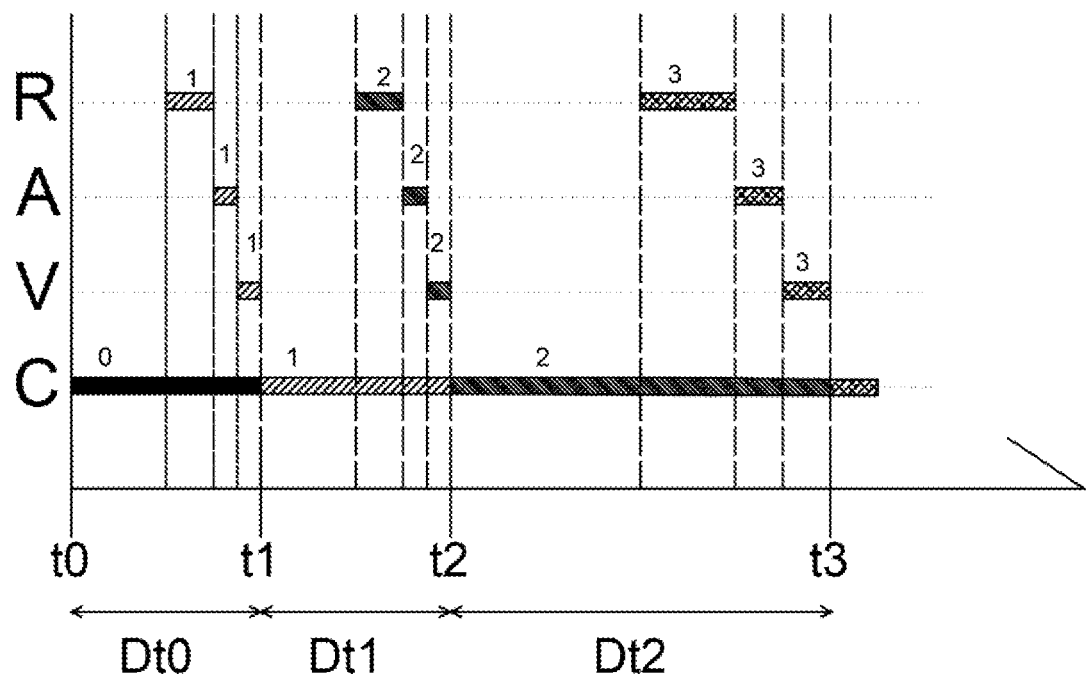
FIGS. 4 and 5 show two schematizations of the method of switching on and off the lights, with respect to a time line

FIG. 4 shows a line of time with the just described method shown schematically.

On the line of time, there are indicated the times (t0, t1, t2, t3) of correct execution starting of each note and/or chord, and the correct duration of each note and/or chord (Dt0, DT1, DT2). Moreover, in the line indicated with reference "C" the switched on notes and/or chords are indicated with the color associated to each finger, in the lines indicated with reference "R", "A", "V" the switched on notes and/or chords are indicated with the red, orange and green color, respectively. So, one's ordinal reference (0 for starting note/chord, 1 for the next one and so on) is associated to each note and/or chord of the time sequence.

From the analysis of FIG. 4, it is clear that during execution of the starting note/chord (0), the keys relating to the next note/chord (1) become red at first, then orange and then green, with ever decreasing anticipations with respect to the respective starting time, and also that each anticipation is a function of the duration of the note which is being executed at the moment.

For example, the three anticipations are respectively equal to half, to a quarter and to an eighth of the duration of the note in execution.

It is to be known in fact that the anticipations with which the lights relating to the note and/or chord starting at time t3 are switched on are greater, since the duration (Dt2) of the previous note is greater.

In another embodiment, the device is configured to carry out a method of indication of the notes to be played, comprising the steps of:

301) associating to each finger of the hand positioned on the keyboard (left hand for right-handed gripping) a respective color;

310) defining a sequence of notes needed to execute a song, by assigning to each one of them a respective duration (Dt0, Dt1, Dt2, Dtn . . . ) and a respective starting time (t0, t1, t2, tn . . . );

320) switching on the LED light relating to the first note of said sequence, with the color associated to the finger which has to press the corresponding key;

330) after a starting instruction by the user, sequentially switching on the lights relating to said sequence of notes by switching the lights relating to each note at the respective starting time (t0, t1, t2, tn . . . ) with the color associated to the finger which has to press the corresponding key.

The method is characterized in that, during the execution of the song, in advance with respect to the execution starting time of each note, the LED lights relating to the string relating to the note to be pressed and to the columns comprised between the note currently in execution and the next one, are switched on sequentially with a first predetermined color.

Figure 5:
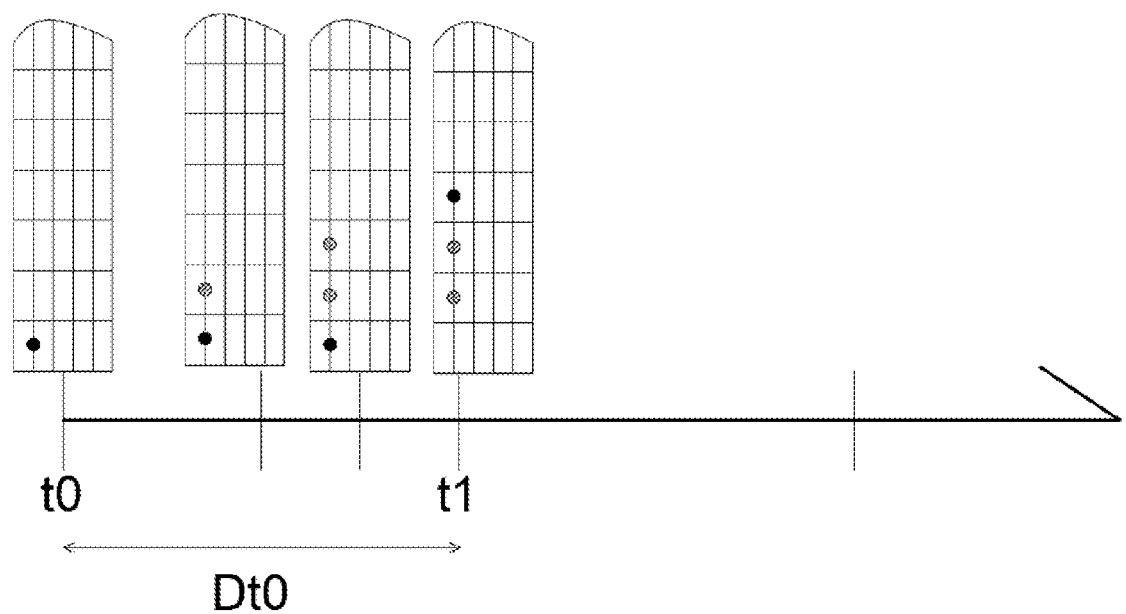

In the example of FIG. 5, this embodiment is shown schematically, in which:

at time t0 the LED light relating to the note to be played in that time (the first one of the song) is switched on, during the execution time interval (Dt0) of the note started at time "t0" the lights relating to the string of the next note to be played are sequentially switched on, whose execution starts at time "t1", said lights being relating to the string of said next note and to the columns comprised between the key of the note to be played at the time t0 and the key of the note to be played at time t1.

So, a luminous wake is formed that leads visually towards the next note to be played with an anticipation with respect to the time of effective execution, and this makes the musician learning easier.

Moreover, preferably, the device is configured to carry out, at the same time as the just described methods of indications of the notes and/or chords to be played, the following method to communicate to the user information about the rhythmical sequence, by switching on the LED lights of said second sub-assembly (11):

410) defining a sequence of notes and/or chords needed to execute a song, by assigning to each one of them a respective duration (Dt0, Dt1, Dt2, Dtn . . . ) and a respective starting time (t0, t1, t2, tn . . . );

420) switching on the led lights of said second sub-assembly corresponding to the first chord or note to be played;

430) in advance to said second chord to be played, sequentially switching on the lights of said secondo sub-assembly, in the direction of the execution.

Also in this case, the anticipation is function of the duration of the chord in execution.

With reference to the direction of switching on of the lights of the second sub-assembly, it is to be specified that if it is needed to execute an up-down picking, the LED lights of said secondo sub-assembly relating to the highest string are switched on at first, and sequentially, the lights relating to the second, third, fourth, fifth and sixth string starting from the top.

Similarly, if it is needed to execute a down-up picking, the LED light of said second sub-assembly relating to the lowest string are switched on at first, and sequentially the lights relating to the second, third, fourth, fifth and sixth string starting from the bottom.

In both cases, if the picking implies a reduced number of strings (for example the three lowest strings), the LED light sequence relates only to the notes implied in the picking to be executed.

The invention claimed is:

1. A device (1) for a string musical instrument learning comprising a controller and a plurality of led lights configured to be able to change the color of their own light emission as a function of the instruction applied by said controller, said led lights being arranged in a plurality of columns (a, b, c) and a plurality of lines (r1, r2);

said device (1) being configured so that each column corresponds to a key of a string instrument keyboard and each line corresponds to a string, so that each LED light is coupled univocally to a respective key of said string instrument keyboard;

said controller (20) being configured to control the switching on, switching off and color of each one of said led lights, wherein each LED lights column is positioned on a respective adhesive support (10) configured to be glued to the handle of the string instrument, under the strings, in that it comprises further computing means on which computer programs are loaded, which are configured to carry out the method comprising the steps of:

100) subdividing said LED lights columns (a, b, c) in a first sub-assembly (10) of LED light columns relating to the keys of said string instrument keyboard, which can be pressed by the musician's hand, and in a second sub-assembly (11) of LED light columns relating to keys not used by the musician;

200) communicating to the musician the indication relating to the keys to be pressed by switching on the LED lights of said first sub-assembly (10), and at the same time, communicating to the musician the indication of the strings to be played and their rhythmical sequence by switching on the LED lights of said second sub-assembly (11) and in that said second sub-assembly (11) of columns of LED lights relating to keys not used by the musician comprises the closest columns to the hand executing the rhythmical part.

2. The device according to claim 1, configured to visualize, by switching on one or more lights of said first sub-assembly of LED lights (10), the notes to be played on the keyboard in advance with respect to the moment in which the same have to be played, and with a variable color as a function of the time remaining before their execution.

3. The device according to claim 1, configured by the following steps:

201) to associate to each finger of the hand positioned on the keyboard (left hand for righthanded gripping) a respective color;

210) to define a sequence of notes and/or chords needed to execute a song, by assigning to each one of them a respective duration (Dt0, Dt1, Dt2, Dtn . . . ) and a respective starting time (t0, t1, t2, tn . . . );

220) to switch on the assembly of lights of the keyboard corresponding to the first chord or note to be played, each light being switched on with the color associated to the finger which has to press the corresponding key;

230) after a starting instruction by the user, to witch on the lights relating to said sequence of notes and/or chords needed to carry out a song, by switching on the lights relating to each note and/or chord at the respective starting time (t0, t1, t2, tn . . . ) and by switching on each LED light with the color associated to the finger which has to press the corresponding key.

4. The device according to claim 3, wherein, during a song execution, the lights relating to said sequence of notes and/or chords needed to carry out a song, are switched on with a first predetermined color, with a first anticipation with respect to its own starting time, and in that said first anticipation is a function of the duration of the immediately previous note and/or chord.

5. The device according to claim 4, wherein, during the song execution, the lights relating to said sequence of notes and/or chords needed to execute a song, are switched on:

with a second predetermined color, with a second anticipation with respect to its own starting time, said second anticipation being lower than the first anticipation and being a function of the duration of the immediately previous note and/or chord;

with a third predetermined color, with a third anticipation with respect to its own starting time, said third anticipation being lower than said second anticipation and being a function of the duration of the immediately previous note and/or chord.

6. The device according to claim 5, wherein said first predetermined color is red, said second predetermined color is orange and said third predetermined color is green.

7. The device according to claim 1, further configured to carry out a method of indication of the notes to be played, comprising the steps of:

301) associating to each finger of the hand positioned on the keyboard a respective color:

310) defining a sequence of notes needed to execute a song, by assigning to each one of them a respective duration (Dt0, Dt1, Dt2, Dtn . . . ) and a respective starting time (t0, t1, t2, tn . . . );

320) switching on the LED light relating to the first note of said sequence, with the color associated to the finger which has to press the corresponding key;

330) after a starting instruction by the user, sequentially switching on the lights relating to said sequence of notes by switching the lights relating to each note at the respective starting time (t0, t1, t2, tn . . . ) with the color associated to the finger which has to press the corresponding key, wherein, during the execution of the song, in advance with respect to the execution starting time of each note, the LED lights relating to the string relating to the note to be pressed and to the columns comprised between the note currently in execution and the next one, are switched on sequentially with a first predetermined color.

8. The device according claim 1, further configured by the steps of:

410) to define a sequence of notes and/or chords needed to execute a song, by assigning to each one of them a respective duration (Dt0, Dt1, Dt2, Dtn . . . ) and a respective starting time (t0, t1, t2, tn . . . );

420) to switch on the led lights of said second sub-assembly corresponding to the first chord or 20 note to be played;

430) in advance to said second chord to be played, to switch on the lights of said secondo subassembly sequentially, in the direction of the execution.

* * * * *